United States Patent
Michot et al.

(10) Patent No.: US 6,561,581 B2
(45) Date of Patent: May 13, 2003

(54) SYSTEM COMPRISING A COVER FASTENED TO A SUPPORT BY MEANS OF SELF-GRIPPING ELEMENTS

(75) Inventors: Nicolas Michot, Leuville sur Orge (FR); Sothy Yam, Soisy sur Seine (FR); Hélène Houivet, Guillerval (FR)

(73) Assignee: Faurecia Siege d'Automobile S.A., Boulogne (FR)

( * ) Notice: Subject to any disclaimer, the term of this patent is extended or adjusted under 35 U.S.C. 154(b) by 13 days.

(21) Appl. No.: 09/874,797

(22) Filed: Jun. 5, 2001

(65) Prior Publication Data

US 2002/0043833 A1 Apr. 18, 2002

(30) Foreign Application Priority Data

Jun. 9, 2000 (FR) .............................................. 00 07435

(51) Int. Cl.$^7$ ............................................... A47C 27/00
(52) U.S. Cl. ................................. 297/218.2; 297/452.6
(58) Field of Search .......................... 297/218.2, 218.3, 297/218.5, 219.1, 228.13, 452.6, DIG. 6; 24/306, 442

(56) References Cited

U.S. PATENT DOCUMENTS

| | | | |
|---|---|---|---|
| 3,630,572 A | * 12/1971 | Homier | |
| 4,069,781 A | 1/1978 | Andersson | |
| 4,740,035 A | * 4/1988 | Kazaoka et al. | 297/452 |
| 5,236,243 A | 8/1993 | Reyes | |
| 5,669,670 A | * 9/1997 | Haraguchi et al. | 297/452.61 |
| 5,826,939 A | * 10/1998 | Beyer | 297/218.3 |
| 6,206,467 B1 | * 3/2001 | Mense et al. | 297/218.2 |
| 6,299,255 B1 | * 10/2001 | Pichon | 297/452.6 |
| 6,443,525 B1 | * 9/2002 | Haupt | 297/452.6 |

FOREIGN PATENT DOCUMENTS

FR          2 761 863          10/1998

OTHER PUBLICATIONS

Search Report issued by the French Patent Office for parent French Application No. 00 07435 filed on Jun. 9, 2000; report dated Feb. 15, 2001.

* cited by examiner

*Primary Examiner*—Peter M. Cuomo
*Assistant Examiner*—Stephen Vu
(74) *Attorney, Agent, or Firm*—Marshall, Gerstein & Borun

(57) ABSTRACT

A system comprising a cover comprising two adjacent parts joined by a seam and forming a seam flap. The seam comprises first and second threads joined to the two respective faces of the seam flap and forming alternating loops which interlock at the free edge of the seam flap. The loops of the two threads form a mesh in which the seam flap is held tightly and without slack, the loops of the first thread being shorter than the loops of the second thread and forcing the seam flap to fold over towards its first face. The loops of the second thread hook onto hook devices belonging to a self-gripping element.

13 Claims, 3 Drawing Sheets

SYSTEM COMPRISING A COVER FASTENED TO A SUPPORT BY MEANS OF SELF-GRIPPING ELEMENTS

FIELD OF THE INVENTION

The present invention relates to systems (seat components in particular) comprising a cover fastened to a support by means of self gripping elements.

More particularly, the invention relates to a system comprising:

a support, a flexible cover that covers the support and comprises at least two adjacent parts joined to each other by a seam along a join line, forming a seam flap comprising two margins that belong to the two respective cover parts and that are folded over toward the support from said join line, the seam flap extending from said join line to a free edge and said seam flap having a first face and a second face that belong to the two respective margins, said seam passing around the seam flap and enclosing the free edge of said seam flap from the join line, and, fastened to the support, at least one self gripping element that comprises hook devices that hook into said seam.

BACKGROUND OF THE INVENTION

Document U.S. Pat. No. 5,236,243 discloses an example of such system.

The seam used in that type of system must in practice comprise several crimped threads if sufficient hooking force is to be obtained. This creates serious problems of implementation (the difficulty of threading it into a sewing machine needle meaning that threading takes two to three times longer than with a conventional thread, the risk of breakage during seaming, etc.).

OBJECTS AND SUMMARY OF THE INVENTION

It is a particular object of the invention to alleviate these problems by providing a system in which a large hooking force can be obtained between the cover and its support without being forced to use several crimped threads in the seam.

To this end, according to the invention, the seam comprises at least a first thread and a second thread joined to the first and second faces, respectively, of the seam flap along said join line, these first and second threads forming loops that alternate between the faces of the seam flap, each loop of the first thread passing through two adjacent loops of the second thread and each loop of the second thread passing through two adjacent loops of the first thread in the vicinity of the free edge of the seam flap in such a way that said loops of the first and second threads form a mesh in which the seam flap is held tightly and without slack, the loops of the first thread being sewn with greater tension than the loops of the second thread in such a way as to force the seam flap to fold over toward its first face, and the loops of the second thread hooking onto the hook devices of the self gripping element.

Owing to the absence of slack between the seam and the seam flap, and to the fact that one entire face of the seam flap is involved in being hooked to the self gripping element of the support, the system according to the invention results in a very considerable hooking force.

In various preferred embodiments of the self gripping element according to the invention, use may if desired be made of any of the following arrangements:

the join line comprises parallel third and fourth threads;

the second thread is a textured multifilament thread, while the other threads of the seam are of a different type;

the second thread has a count of between 80 and 280 Tex, the seam is of the so called "false safety" type, produced on the basis of stitch No. 512 of the ISO 4915 standard;

the system forms a seat part, while the support forms a padding;

each hook device of the self gripping element comprises a stem that rises from the support toward the seam and that ends in an enlarged head forming several lobes separated angularly from each other by recessed areas, the lobes of the enlarged head projecting out toward the support compared with the recessed areas of said head, and each lobe having a convex face directed away from the support;

the hook devices extend in different directions away from the support;

the hook devices are arranged in pairs of adjacent hook devices on the support, the two hook devices of each pair diverging away from each other and from the support;

most of the hook devices extend in two distinct main directions;

the stem of each hook device is more flexible than the head of the said hook device;

most of the heads of the hook devices comprise four lobes each;

the seam flap is between 7 and 10 mm wide.

BRIEF DESCRIPTION OF THE DRAWINGS

Other features and advantages of the invention will become apparent in the course of the following description of several of its embodiments. These are given by way of non-limiting example in the light of the attached drawings.

In the drawings.

MORE DETAILED DESCRIPTION

In the various figures, identical or similar elements are indicated by the same reference numbers.

Figure 1:
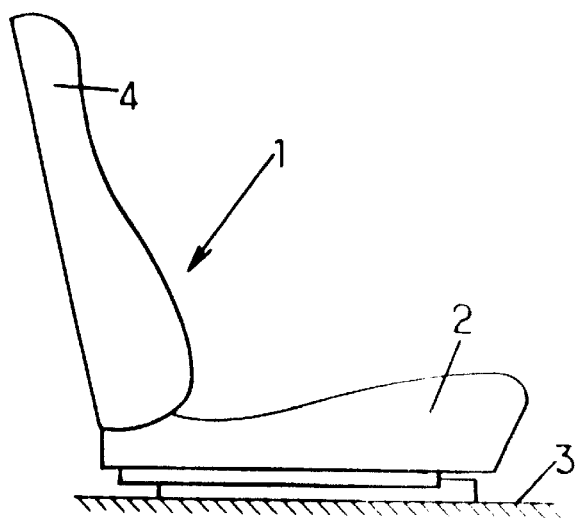
FIG. 1 is a schematic view of a vehicle seat in which the squab or horizontal part is covered by a cover fastened by means of a self-gripping element in accordance with one embodiment of the invention.

FIG. 1 shows a motor vehicle seat I comprising on the one hand a squab 2 that stands on the floor 3 of the vehicle, and on the other hand a backrest 4 mounted on the squab.

Figure 2:
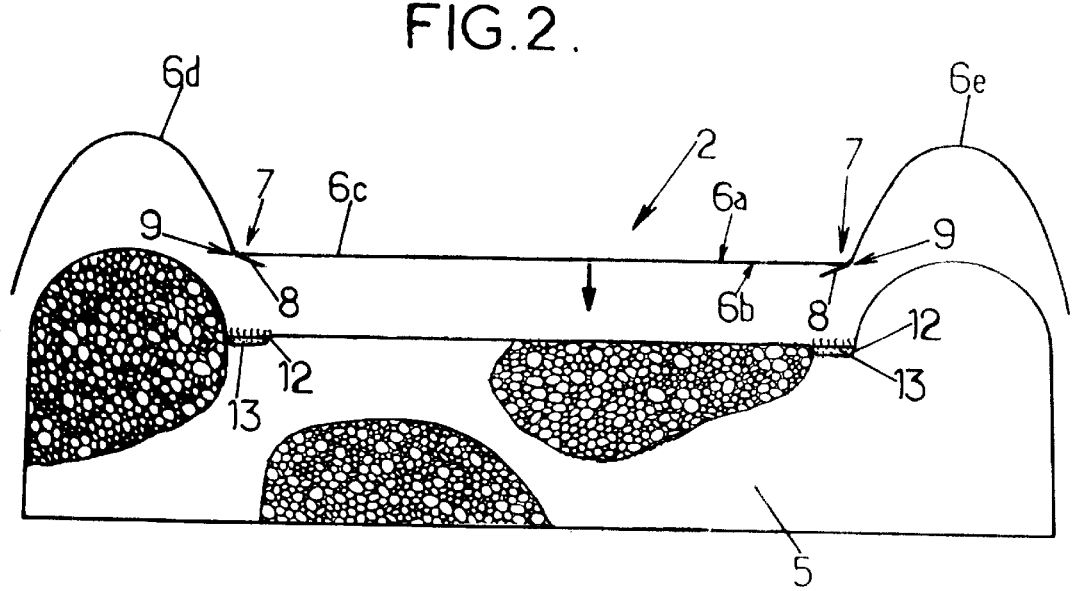
FIG. 2 is an exploded view in transverse section of the squab of the seat shown in FIG. 1.

As shown in FIG. 2, the squab 2 comprises a flexible padding 5 made for example from synthetic foam and covered with a flexible cover 6 made for example of fabric, leather or other material.

The cover 6 comprises an outer face 6a and, toward the padding 5, an inner face 6b. Furthermore, said cover 6 is made in several parts 6c, 6d, 6e joined to each other by seams 9 along join lines 7, forming seam flaps 8 which are folded toward the padding 5.

The threads of the seams 9 are hooked onto self-gripping tapes 13 integral with the padding 5 and lying, for example, in the bottom of grooves 12 or the like, in such a way as to form cover 6 tensioning lines. Moreover, the periphery of the cover 6 is conventionally fastened to the frame of the squab 2 by hooks or edge trims (not shown).

Figure 3:
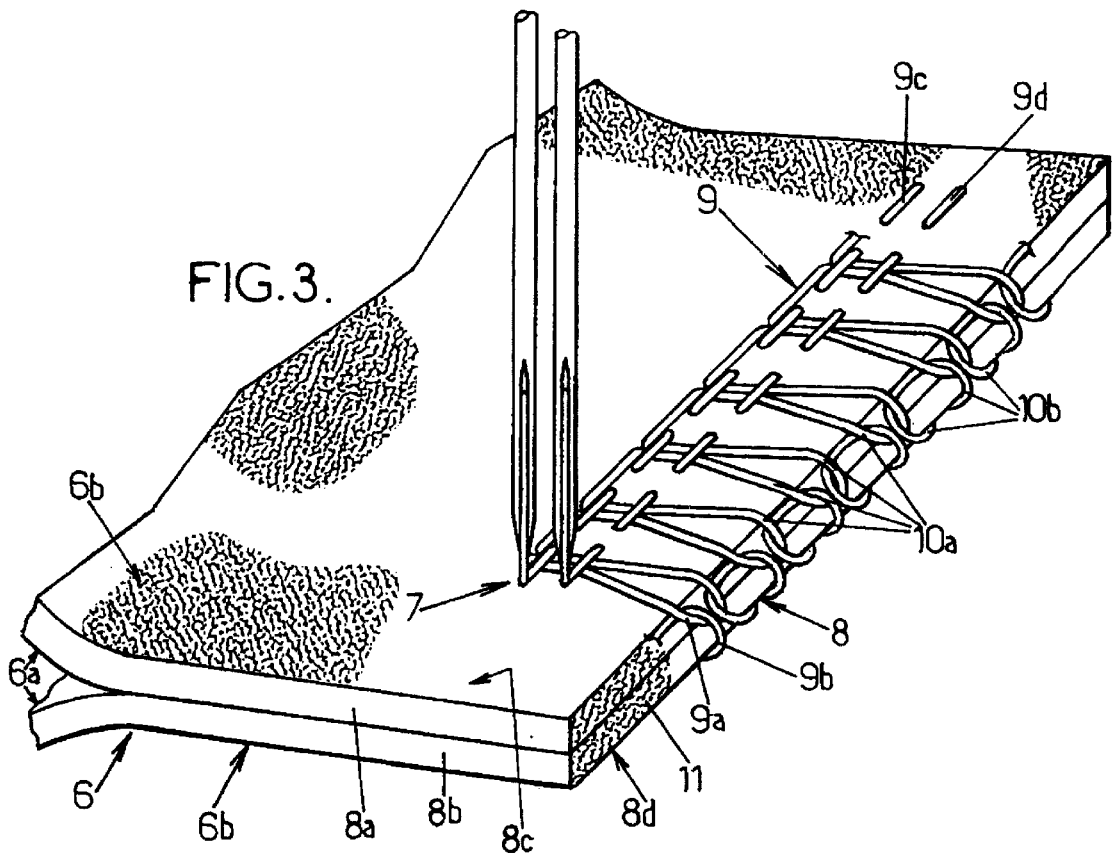
FIG. 3 is a detail perspective view showing the realization of one of the seams of the cover covering the squab shown in FIG. 2.

As shown in FIG. 3, the seam flap 8 consists of two margins 8a, 8b belonging to the two adjacent cover parts joined by the seam 9. The seam flap has two outer faces 8c, 8d formed by the two margins 8a, 8b, respectively, and the said flap extends to a width of between for example 7 and 10 mm, between the join line 7 and a free edge 11 which is arranged towards the padding 5.

To create the seam 9, the two adjacent parts 6c, 6d or 6c, 6e of the cover are placed with their two outer faces 6a in mutual contact. This seam 9 is preferably of the "false safety" type corresponding to stitch No. 512 of the ISO 4915 standard.

The seam 9 comprises four threads, namely:
a first thread 9a which runs from side to side on the face 8c of the seam flap to form a series of loops 10a extending from the join line 7 to about the free edge 11 of the seam flap, the first thread not passing through the cover, a second thread 9b laid in a similar way to the first thread 9a on the second face 8d of the seam flap, the loops 10b of the second thread being laid so as to alternate with the loops 10a of the first thread and the said loops 10b of the second thread each passing through two adjacent loops 10a of the first thread, while each loop 10a of the first thread passes through two adjacent loops 10b of the second thread, and a third thread 9c and a fourth thread 9d, which are sewn into the cover by means of two needles 22, the third and fourth threads 9c, 9d being laid parallel to each other along the join line 7, and each loop 10a, 10b of the first and second threads being fastened to the cover along the join line 7 by two stitches formed by the third and fourth threads 9c, 9d, respectively.

As the seam 9 is being created, the first thread 9a is kept at a greater tension than the second thread 9b so that the loops 10a of said first thread are slightly shorter than the loops 10b of the second thread and so that the loops 10a, 10b together form a mesh in which the seam flap 8 is held tightly without slack.

Figure 4:
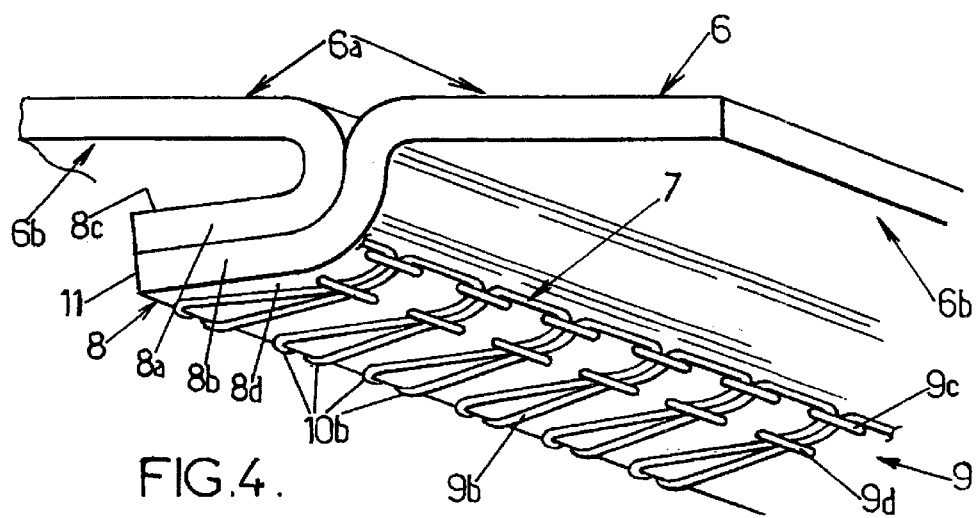
FIG. 4 is a detail perspective view showing the seam as in FIG. 3, in the position of use.

Thus, as shown in FIG. 4, when the cover 6 is placed in its position of use, with the outer faces 6a of the two adjacent parts of the cover being approximately a continuation of each other, the seam flap 8 tends to fold over towards its first face 8c.

Consequently the whole of the second face 8d of the seam flap ends up facing the corresponding self-gripping tape 13, and by this means the said self-gripping tape is enabled to hook itself onto a relatively large surface area.

In addition, the hooking force between the self-gripping tape and the second thread 9b is made greater by the fact that there is no slack between the threads 9a, 9b and the flap 8 of the seam.

To further improve the effectiveness of this hooking action, the second thread 9b of the seam may advantageously be a textured multifilament thread (such as a crimped thread or multifilament thread with little twist), while the other threads in the seam are conventional threads.

The thickness of the second thread 9b of the seam will be for example between 80 and 280 Tex.

The following are some examples:
a polypropylene or polyamide thread such as "BCF" sold by IDEAL FIBERS, composed of 100 to 270 fibers, with a count of 120 to 290 Tex and a tensile strength of 2.5 to 7 kg (breaking limit), a polyester thread of textured type sold by BOWMANN, composed of 96 fibers, with a count of 107 Tex and a tensile strength of 3 kg, or a polyamide thread such as "BCF PATX" sold by COUSIN FILERIE, with a count of 280 Tex and a tensile strength of 7 kg.

Figure 5:
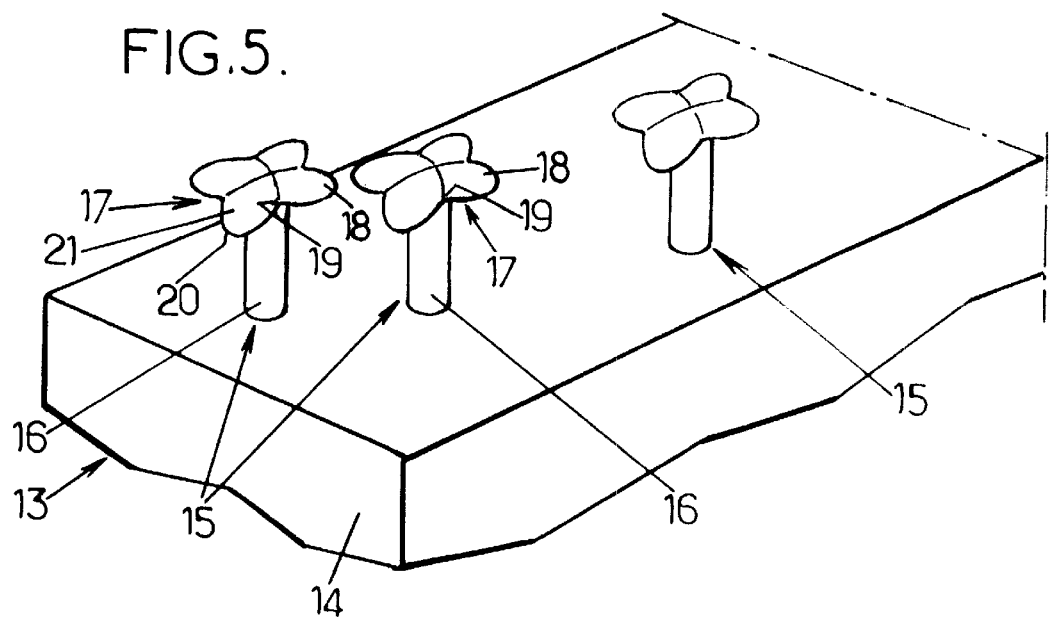
FIG. 5 is a detail perspective view showing one of the self-gripping tapes suitable for hooking onto the seam shown in FIG. 4.

In addition, as shown in FIG. 5, each self-gripping tape 13 may comprise:
a base 14 fastened to the padding 5 and made for example of plastic, and a plurality of mushroom-shaped hook devices 15, which are also made of plastic and project from the surface of the base 14.

Figure 6:
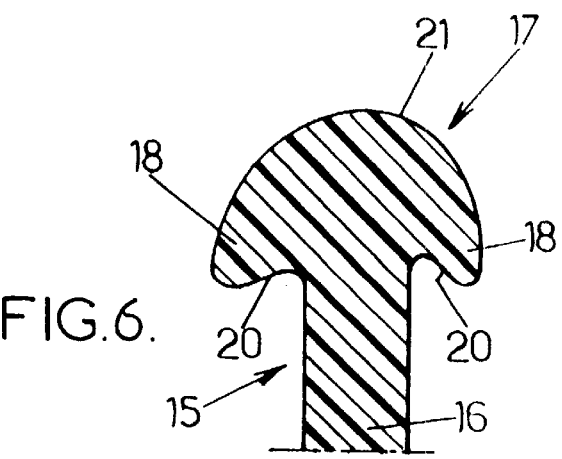
FIG. 6 is a longitudinal section through one of the hooking devices of the self-gripping tape shown in FIG. 5.

Each hook device 15, which is clearly visible in FIGS. 5 and 6, comprises a stem 16 rising for example 0.5 to 2 mm from the base 14 to an enlarged head 17. The enlarged head 17 advantageously forms several lobes 18 (of which there are preferably four for most of the hook devices 15) which are separated angularly from each other by recessed areas 19. The lobes 18 can be made by rolling, for example. The lobes of the enlarged head project radially outward and axially toward the base 14 by comparison with the recessed areas 19 of the said head. Each lobe presents a preferably concave face 21 oriented towards the base 14 and a convex face 21 oriented toward the folded-over strips 8 of the cover.

The hook devices 15 are preferably relatively flexible in the vicinity of the base 14 and more rigid nearer their head 15.

By means of these arrangements, the fibers of the thread 9b of the seam (and where relevant other fibers belonging to the face 8d of the seam flap) engage under the lobes 18 of the hook devices 15 when the cover 6 is placed on the padding 5, despite the absence of slack between the seam 9 and the seam flap 8.

Figure 7:
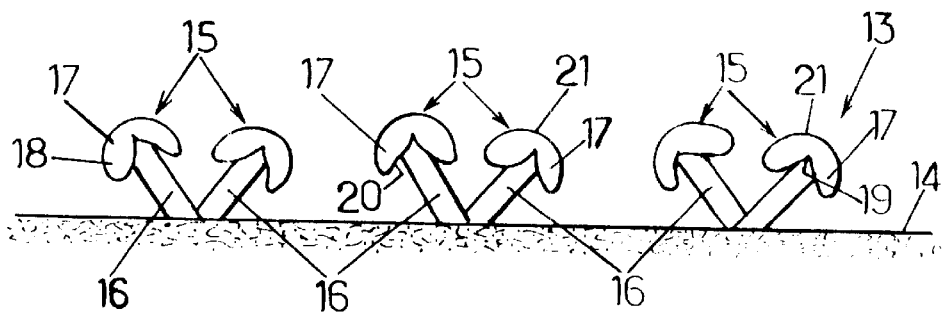
FIG. 7 is a detail view of a self-gripping tape that can be used to fasten the cover to the padding of the squab, in a second embodiment of the invention.

In one advantageous embodiment, as shown in FIG. 7, the stems 16 of the hook devices 15 may extend in several directions from the base 14. The hook devices 15 may advantageously be arranged in pairs on the surface of the base 14, in which case the stems 16 of the two hook devices of one pair extend from two neighboring or coinciding points on the base 14 in two directions not perpendicular to the surface of the base 14. These two directions are preferably common to all pairs of the hook devices.

The use of the special self-gripping tape 13 described above further increases the hooking force between said self-gripping tape and the seam 9. In particular, a self-gripping tape of the type shown in FIG. 7, having a width of 12 mm and having pairs of hook devices spaced out from each other at a distance of between 1 and 5 mm, can be used to hook easily with a tear-off strength (tensile strength)

greater than 100 N per cm length of tape with a seam of the "false safety" kind and a seam flap with a width of 7 to 10 mm.

It will be observed that the invention would be applicable to any seat component besides a squab, and to any item covered with a cover, besides a seat component.

We claim:

1. A system comprising:

a support, a flexible cover that covers the support and comprises at least two adjacent parts joined to each other by a seam along a join line, forming a seam flap comprising two margins that belong to the two respective cover parts and that are folded over towards the support from said join line, the seam flap extending from said join line to a free edge and said seam flap having a first face and a second face that belong to the two respective margins, said seam passing around the seam flap and enclosing the free edge of said seam flap from the join line, and, fastened to the support, at least one self-gripping element that comprises hook devices that hook into said seam, wherein the seam comprises at least a first thread and a second thread joined to the first and second faces, respectively, of the seam flap along said join line, the first and second threads forming loops that alternate between the first and second faces of the seam flap, each said loop of the first thread passing through two adjacent said loops of the second thread and each said loop of the second thread passing through two adjacent said loops of the first thread around, the free edge of the seam flap, wherein said loops of the first and second threads form a mesh in which the seam flap is held tightly and without slack, wherein the loops of the first thread are sewn and tensioned so that said loops of the first thread force the seam flap to fold over towards said first face, and wherein the second face of the seam flap faces toward the support and the loops of the second thread hook onto the hook devices of the self-gripping element on said second face of the seam flap.

2. The system according to claim 1, in which the join line comprises parallel third and fourth threads.

3. The system according to claim 1, in which only the second thread is a textured multifilament thread.

4. The system according to claim 3, in which the threads forming the seam have a count of between 80 and 280 Tex.

5. The system according to claim 1, in which the seam is produced on the basis of stitch No. 512 of the ISO 4915 standard.

6. The system according to claim 1, forming a seat part, while the support forms a padding.

7. The system according to claim 1, in which each said hook device of the self-gripping element comprises a stem that rises from the support towards the seam and ends in an enlarged head forming several lobes separated angularly from each other by recessed areas, and each said lobe having a convex face directed away from the support.

8. The system according to claim 7, in which the hook devices extend in different directions away from the support.

9. The system according to claim 8, in which the hook devices are arranged in pairs of adjacent hook devices on the support, the two hook devices of each said pair diverging away from each other and from the support.

10. The system according to claim 9, in which most of the hook devices extend in two distinct main directions.

11. The system according to claim 7, in which the stem of each said shook device is more flexible than the head of said hook device.

12. The system according to claim 7, in which most of the heads of the hook devices each comprise four lobes.

13. The system according to claim 1, in which the seam flap is between 7 and 10 mm wide.

* * * * *

UNITED STATES PATENT AND TRADEMARK OFFICE
CERTIFICATE OF CORRECTION

PATENT NO. : 6,561,581 B2  
DATED : May 13, 2003  
INVENTOR(S) : Michot et al.

It is certified that error appears in the above-identified patent and that said Letters Patent is hereby corrected as shown below:

<u>Title page,</u>
Item [57] ABSTRACT,
Line 1, please replace "A system comprising" with -- System comprising --.

<u>Column 6,</u>
Line 32, please replace "said shook device" with -- said hook device --.

Signed and Sealed this

Sixteenth Day of September, 2003

JAMES E. ROGAN
*Director of the United States Patent and Trademark Office*